(12) United States Patent
Oettinger et al.

(10) Patent No.: US 12,729,810 B2
(45) Date of Patent: Sep. 8, 2026

(54) CONTROL BLOCK FOR A LUBRICATION SYSTEM, AND A LUBRICATION SYSTEM

(71) Applicant: SKF Lubrication Systems Germany GmbH, Walldorf (DE)

(72) Inventors: Wolfgang Rudolf Oettinger, Germersheim (DE); Andreas Robert Stellmach, Heddesheim (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 0 days.

(21) Appl. No.: 18/623,144

(22) Filed: Apr. 1, 2024

(65) Prior Publication Data

US 2024/0344658 A1 Oct. 17, 2024

(30) Foreign Application Priority Data

Apr. 11, 2023 (DE) ........................ 102023203272.4

(51) Int. Cl.
*F16N 7/38* (2006.01)
*F16N 39/06* (2006.01)

(52) U.S. Cl.
CPC ............... *F16N 7/38* (2013.01); *F16N 39/06* (2013.01); *F16N 2270/62* (2013.01); *F16N 2270/70* (2013.01); *F16N 2280/02* (2013.01)

(58) Field of Classification Search
CPC .. F16N 39/06; F16N 2270/62; F16N 2270/70; F16N 2280/02
USPC ........................................................ 184/6.28
See application file for complete search history.

(56) References Cited

U.S. PATENT DOCUMENTS 1,487,539 A 3/1924 Clementz
1,963,783 A 6/1934 Fox
2,187,684 A 1/1940 Fox et al.
2,636,441 A 4/1953 Woefler
2,787,225 A 4/1957 Rotter
3,469,532 A 9/1969 Wegmann et al.
(Continued)

FOREIGN PATENT DOCUMENTS

CA 2678228 A1 4/2010
WO 2015021260 A1 2/2015

OTHER PUBLICATIONS

"Dyna-Star® HP and HF Pump Auto-Fill® Shut Off Kit," Instructions, 332518F, Graco Information, Graco Inc., Minneapolis, MN, Aug. 2021, 14pgs.

(Continued)

*Primary Examiner* — Minh Truong
*Assistant Examiner* — Mark K Buse
(74) *Attorney, Agent, or Firm* — Stinson LLP

(57) ABSTRACT

A control block (1) for a lubrication system has a main body (2) with at least one inlet port (4) and at least one outlet port (6). A primary connecting line (8) fluidically connects the inlet port (4) to the outlet port (6). The main body (2) has at least one return port (10). A relief valve (12), in an open state, opens a connection between the primary connecting line (8) and the return port (10), and, in a closed state, builds up pressure in the primary connecting line (8), for lubricant to be conveyed to the at least one lubrication point via the outlet port (6). The relief valve (12) changes from a closed state to an open state when the pressure in the primary connecting line (8) exceeds a predefined pressure value.

34 Claims, 3 Drawing Sheets

(56) References Cited

U.S. PATENT DOCUMENTS 3,477,546 A * 11/1969 Gruber .................... F16N 25/02 184/6
3,502,029 A 3/1970 Halladay
3,806,088 A 4/1974 Stoneman
3,945,772 A 3/1976 Van de Moortele
4,487,340 A 12/1984 Shaffer
4,762,474 A 8/1988 Dartnall
4,769,978 A * 9/1988 Reichen ............... A01D 46/088 56/28
5,099,955 A * 3/1992 Mangen ................ F16N 19/006 184/7.4
6,102,676 A 8/2000 DiCarlo et al.
6,286,627 B1 * 9/2001 Grach .................. E21B 17/006 184/7.4
6,736,155 B1 5/2004 Johnson
6,872,161 B2 3/2005 DiCarlo
7,997,456 B2 8/2011 Shew
8,109,295 B2 2/2012 Osteen
8,186,327 B2 * 5/2012 Ni ............................ F01M 1/16 123/196 S
8,307,854 B1 11/2012 Vu
8,397,763 B2 3/2013 deGreef
9,140,246 B2 9/2015 Conley et al.
9,157,576 B2 10/2015 Divisi
9,222,618 B2 12/2015 Donovan
9,239,044 B2 1/2016 Conley et al.
9,388,804 B2 * 7/2016 Williamson ............ F04B 49/22
9,388,940 B2 7/2016 Conley
10,527,228 B2 1/2020 Holman et al.
10,774,988 B2 9/2020 Holman
10,781,971 B2 9/2020 Holman et al.
10,969,058 B2 4/2021 Li
11,427,911 B2 8/2022 Watanbe
11,859,762 B2 1/2024 Conley
2006/0054404 A1 * 3/2006 El-Ibiary ............. F16C 33/1085 184/6
2006/0070810 A1 * 4/2006 Coppins .................... F16N 7/38 184/6.1
2006/0225792 A1 10/2006 Stamler
2007/0209878 A1 * 9/2007 Czechowski ........... F16N 39/06 184/6
2007/0240434 A1 10/2007 Allen
2007/0289652 A1 12/2007 Curran
2008/0289711 A1 11/2008 Shultz
2009/0057063 A1 * 3/2009 Marek ..................... F16N 29/00 184/7.4
2011/0072888 A1 3/2011 Ambrose
2011/0095216 A1 4/2011 deGreef
2013/0092284 A1 4/2013 Holland
2013/0256062 A1 10/2013 Kotyk et al.
2014/0097043 A1 * 4/2014 Hoshinoya ............. B60K 11/02 184/6.4
2016/0186928 A1 6/2016 Holman
2016/0298662 A1 10/2016 Taylor
2018/0100620 A1 4/2018 Holman
2018/0112685 A1 * 4/2018 Beschorner ........... F15B 21/087
2020/0011410 A1 * 1/2020 Shimizu ................. B60K 6/543
2022/0275907 A1 9/2022 Song
2022/0373120 A1 11/2022 Hestetun
2023/0033674 A1 2/2023 Suzuki
2023/0098293 A1 3/2023 Seidl
2023/0272865 A1 8/2023 Grimm
2025/0092989 A1 3/2025 Holland

OTHER PUBLICATIONS

"Dyna-Star® 200:1 and 120:1 Grease Pumps," Instructions, 3A7519C, Graco Information, Graco Inc., Minneapolis, MN, Jan. 2023, 28pgs.
"Dyna-Star® HP Pump System," Instructions, 3A3956D, Graco Information, Graco Inc., Minneapolis, MN, Oct. 2019, 26pgs.
"10:1 Dyna-Star® Pump Module with Auto-Fill Shutoff," Instructions, 3A3429D, Graco Information, Graco Inc., Minneapolis, MN, Aug. 2022, 28pgs.
"Dyna-Star® HP Pump System," Instructions, Repair and Parts, 332540J, Graco Information, Graco Inc., Minneapolis, MN, Jul. 2022, 16pgs.
"Dyna-Star® Hydraulic Reciprocator and Pump," Instructions, Repair and Parts, 312350L, Graco Information, Graco Inc., Minneapolis, MN, Oct. 2015, 28pgs.
"10:1 Dyna-Star® Pump Module," Instructions, Repair and Parts, 312349G, Graco Information, Graco Inc., Minneapolis, MN, Oct. 2010, 22pgs.
"5:1 Dynastarr Pump Module," Instructions—Parts List, 309098G, Graco Inc., Minneapolis, MN, Jan. 2017, 16pgs.
"50:1 Fire-Ball® 300 Pump Module," Instructions—Parts List, 308955F, Graco Inc., Minneapolis, MN, Sep. 2007, 16pgs.
"Compact Dyna-Star® Electric Pump," Instructions, 3A6941L, Graco Information, Graco Inc., Minneapolis, MN, Apr. 2022, 54pgs.
"Single-line automatic lubrication systems," Product catalogue 2023, SKF, 200pgs.
"FlowMaster reservoir level sensor and overflow prevention system," Lincoln/SKF, 2012, 4pgs.
"Mechanical overflow prevention system," Lincoln/SKF, 2020, 4pgs.
"FlowMaster II hydraulic pump and reservoir assembly," User and maintenance instructions, Model 85879, series "A", SKF, Jun. 2023, 13pgs.
"FlowMaster II rotary driven hydraulic pump," User and maintenance instructions, Models 85705 and 85705MSO, series "B" CAT branded, SKF, Jan. 2021, 12pgs.
"FlowMaster II rotary driven hydraulic pump," User and maintenance instructions, Model 85722-AU, 85764 and 85764-AU, series "A", SKF, Jul. 2023, 20pgs.
"FlowMaster II rotary driven hydraulic pump series "A"," User and maintenance instructions, Models 85731, 5 U.S. gallons, 85732, 60 lbs (27 kg), 85733, 120 lbs (54 kg), 85734, 400 lbs (181 kg), 85138, 400 lbs (181 kg), 85144 (CAT branded), SKF, Feb. 2023, 28pgs.
"FlowMaster II rotary driven hydraulic pump, series "A"," Operation, assembly, disassembly and troubleshooting guide, Lincoln/SKF, Jan. 2014, 24pgs.
"FlowMaster II pump," User and maintenance instructions, Model 85875, SKF, Mar. 2016, 12pgs.

* cited by examiner

CONTROL BLOCK FOR A LUBRICATION SYSTEM, AND A LUBRICATION SYSTEM

CROSS-REFERENCE TO RELATED APPLICATION

This application claims priority to German Application No. 102023203272.4, filed Apr. 11, 2023, the entirety of which is hereby incorporated by reference.

FIELD

The present disclosure relates to a control block for a lubrication system according to the preamble of claim 1. The present disclosure also relates to a lubrication system.

BACKGROUND

There are many machine installations which have a plurality of components requiring lubrication. For example, lubricant can be supplied to the various components or lubrication points via a lubrication system, in particular a central lubrication system. In order to ensure that a sufficient amount of lubricant is supplied to the lubrication points, and indeed at the required flow rate over the relevant distances, it can be necessary to use high pressure gradients or for the lubricant in a primary lubricant line to be subjected to a sufficiently high pressure.

As a result of the high pressure there is, inter alia, the risk of lines and/or connecting points in the lubrication system developing a leak. This can result in lubricant escaping at these points and in a lubricant leak. In the worst-case scenario, when the pressure in the lubrication system becomes excessively high, a line and/or connecting point can even burst or crack, as a result of which not only can a considerable amount of lubricant escape from the lubrication system, but there is also the potential danger of the machine installation being damaged and/or the person operating the machine installation and/or the lubrication system being injured.

SUMMARY

The object of the present disclosure is therefore to provide a control block intended for a lubrication system and having an improved service life and improved protection against leakage.

This object is achieved by a control block according to claim 1.

A control block for a lubrication system is proposed below. The lubrication system can be, in particular, a central lubrication installation. The control block comprises a main body, wherein the main body has at least one inlet port and at least one outlet port. Provision is further made in the main body for a primary connecting line, which fluidically connects the inlet port to the outlet port. The main body also has at least one return port.

In particular, the at least one inlet port can be fluidically connectable to a lubricant inlet line, which is designed to convey lubricant to the control block. For example, the inlet port can be connected to a lubricant pump via the lubricant inlet line. Furthermore, the outlet port can be fluidically connectable to at least one lubricant outlet line, wherein the at least one lubricant outlet line is designed to convey lubricant to at least one lubrication point.

Moreover, provision is made in the main body for a relief valve, which is configured so that, in an open state, it opens a connection between the primary connecting line and the return port, and, in a closed state, it allows a pressure to be able to build up in the primary connecting line, in order for lubricant to be conveyed to the at least one lubrication point via the outlet port. Once the lubricant has been conveyed to the at least one lubrication point, the pressure which has built up in the lubricant line can be relieved by the relief valve being opened. The relief valve can be opened and closed for example electrically, pneumatically, mechanically and/or hydraulically.

In order for the service life of the control block to be increased and the risk of a leakage of lubricant to be reduced, the relief valve is also designed to change the state from a closed state to an open state when the pressure in the primary connecting line exceeds a predefined pressure value. This makes it possible to reduce the risk of the lubricant line bursting and/or of a leak occurring on account of an overpressure at a connecting point at which for example two lines are connected together or a line is connected to the control block. Additionally, as a result of the fact that the relief valve opens in the event of an overpressure on the primary connecting line, it is possible to dispense for example with a pressure-limiting valve in order to prevent an overpressure in the lubricant system.

Preferably, the main body is a monolithic main body. For example, openings and/or bores, which form for example the primary connecting line and or a receptacle for other components, can be formed in a solid, single-piece main body using a material-removing process, for example drilling, milling, etc. Alternatively or additionally, the main body can be cast, wherein the openings and/or bores are formed directly in the main body during casting. The use of a main body advantageously enables the number of lines and/or connecting ports required to be reduced, since elements of the lubrication system, for example a receptacle for the relief valve or the primary connecting line, can be formed in the main body. This firstly allows the number of components used to be reduced and secondly allows the risk of leakage to be reduced, since the number of points at which leakage can occur is reduced.

According to another exemplary embodiment, the relief valve is a hydraulic valve. A hydraulic valve is understood to mean a valve which is opened and/or closed with the aid of a hydraulic pressure. The relief valve can be in particular a hydraulic valve which is closed by being subjected to a hydraulic pressure. In this case, for example, the component responsible for closing the valve can be pressed into a corresponding seal seat by means of the hydraulic pressure, in order to close the relief valve.

In particular, the hydraulic valve can be configured such that an applied hydraulic pressure is used to determine the pressure value from which, in the primary connecting line, the relief valve transitions from the closed state into the open state, in order to relieve the primary connecting line in the event of an overpressure state. For example, the hydraulic valve can be designed to open when a multiple of a hydraulic pressure value prevails in the primary connecting line. Therefore, a pressure gauge for determining the pressure in the primary connecting line can advantageously be dispensed with, as a result of which it is possible to make further cost savings.

Furthermore, the main body can have at least one control port, via which the relief valve is provided with a hydraulic fluid, in order for the relief valve to be subjected to a hydraulic pressure. This allows the control block to have a compact design. In particular, the predefined pressure value at which the relief valve transitions from a closed state into an open state in the event of an overpressure in the primary connecting line can be set using the hydraulic pressure. Alternatively or additionally, provision can be made for a pressure-regulating unit in order to regulate the hydraulic pressure.

Furthermore, the hydraulic valve can be subjected to pressure via a hydraulic port of a lubricant pump of the lubrication system. This has the advantage that a separate hydraulic pump, via which the hydraulic valve can be subjected to pressure, can be dispensed with. Preferably, the predefined pressure value can be set using a hydraulic pressure. For example, the hydraulic valve can be designed such that it opens as soon as a pressure in the primary connecting line exceeds a predefined multiple of the hydraulic pressure. This allows the control block to be provided with an overpressure-protection function in a simple manner. In particular, a separate pressure gauge can be dispensed with as a result.

According to another embodiment, the relief valve can be controlled using an upstream valve. For example, the electric valve can control the supply of a hydraulic fluid to a relief valve designed as a hydraulic valve. As a result, the electric valve can also control whether, and for how long, the hydraulic valve can be subjected to a pressure. This has the advantage that the provision of the electric valve makes it possible to implement for example a holding time, in which the relief valve continues to be closed, as a result of which the lubricant pressure in the primary connecting line can be maintained, but the lubricant pump has already been switched off. Such a holding time can allow, in the case of a long lubricant line to the lubrication points, a sufficient amount of lubricant to reach the lubrication points even if the lubricant pump of the lubrication system has already been switched off. This can result in reduced wear and consequently in a longer service life of the lubrication system. The electric valve can be designed for example as a 3/2-way valve. A 3/2-way valve conventionally has three ports and two positions, which can be activated pneumatically, mechanically, manually or electrically using a solenoid valve.

Furthermore, provision can be made for a filter upstream of the relief valve. In particular, the filter can be provided downstream of the inlet port and be correspondingly received in the main body. As a result, the connections in the lubricant system can be further reduced since the connections between the filter and the primary connecting line can be provided directly in the main body. This further reduces the probability of a lubricant leak.

Additionally, the main body can be formed from metal or a fibre-reinforced plastics material. In particular, the main body can be formed from steel and/or aluminium. This allows for a stable main body which can easily be provided with corresponding bores, which form the connecting lines and/or the receptacles for valves and/or filters.

According to another aspect, a lubrication system is proposed, having at least one lubricant pump, at least one lubricant line, which is designed to convey lubricant to at least one lubrication point, and an above-described control block, wherein the control block is arranged downstream of the lubricant pump and upstream of the at least one lubricant line. In particular, the lubrication system can have at least one lubricant reservoir.

Further advantages and advantageous embodiments are specified in the description, the drawings and the claims. In particular the combinations of the features specified in the description and in the drawings are purely exemplary here, and therefore the features can also be present individually or in other combinations.

BRIEF DESCRIPTION OF THE DRAWINGS

In the following text, the present disclosure will be described in more detail using exemplary embodiments illustrated in the drawings. The exemplary embodiments and the combinations shown in the exemplary embodiments are purely exemplary here and are not intended to define the scope of protection of the present disclosure. This is defined solely by the attached claims.

In the drawings.

In the following text, identical or functionally equivalent elements are identified by the same reference signs.

DETAILED DESCRIPTION

Figure 1:
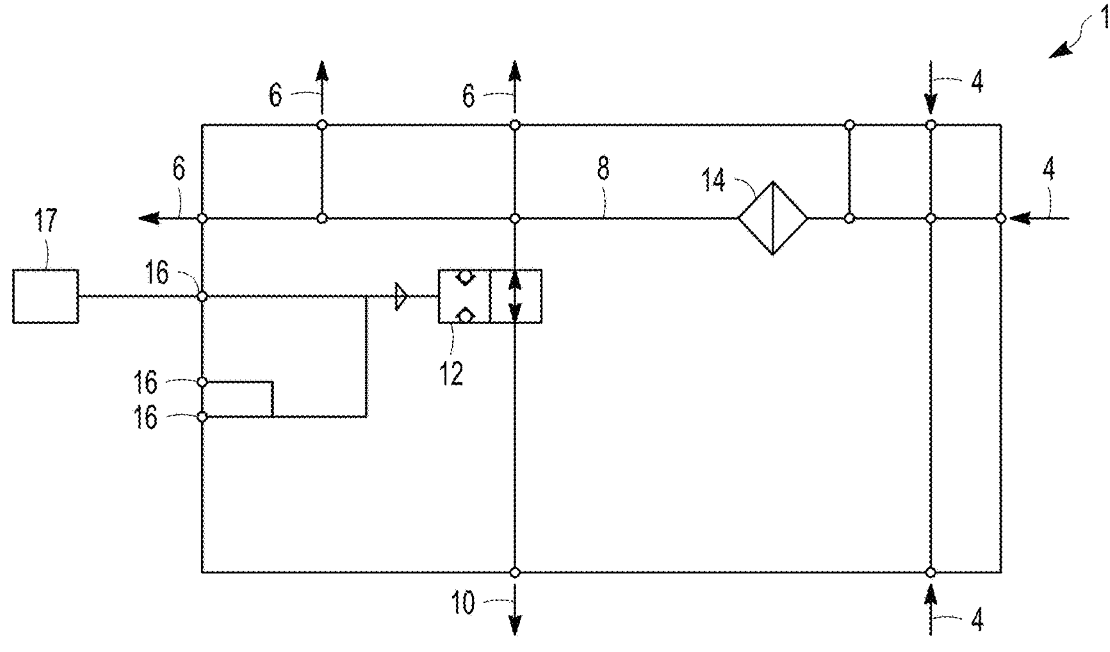
FIG. 1 shows a diagram for a control block according to a first embodiment.
Figure 3:
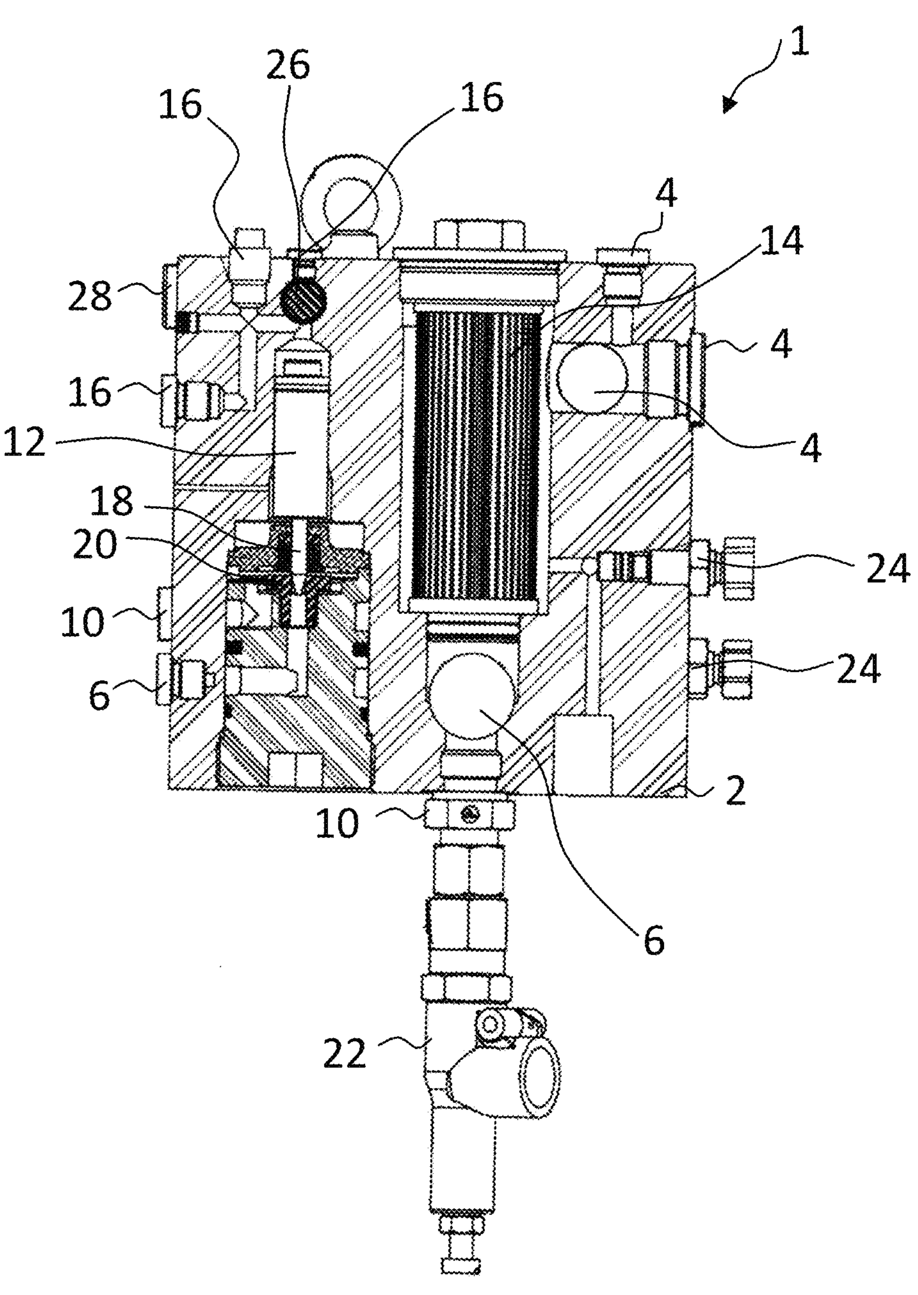
FIG. 3 shows a cross-sectional view through the control block according to the second embodiment.

FIG. 1 shows a diagram for a control block 1 for a lubrication system according to a first embodiment. The control block 1 comprises a main body 2 (FIG. 3). Provision is made in the main body 2 for three inlet ports 4, via which the control block 1 can be fluidically connected to a lubricant pump (not shown) by means of a lubricant inlet line (not shown). It is, however, also possible for just one inlet port 4, two inlet ports 4, or even more than three inlet ports, to be provided. Furthermore, just one lubricant inlet line can be connected to one of the three inlet ports 4, and the two others can be closed for example using a blind flange. It is, however, also conceivable for more than one lubricant inlet line to be provided.

The main body 2 also has three outlet ports 6, via which lubricant can be conveyed to at least one lubrication point by means of at least one lubricant outlet line (not shown). It is, however, also possible for just one outlet port 6, two outlet ports 6, or even more than three outlet ports, to be provided. Also, just one lubricant outlet line can be connected to one of the three outlet ports 6, and the two others can be closed for example using a blind flange. It is, however, also conceivable for more than one lubricant outlet line to be provided.

Provision is also made in the main body 2 for a primary connecting line 8, which fluidically connects the inlet ports 4 to the outlet ports 6, and for a return port 10, via which lubricant located in the control block 1, for example in the primary connecting line 8, can be conveyed back to the lubricant pump or to a lubricant reservoir.

Furthermore, provision is made in the main body 2 for a relief valve 12, which is configured so that, in an open state, it opens the connection between the primary connecting line 8 and the return port 10, and, in a closed state, it allows a pressure to be able to build up in the primary connecting line 8, in order for lubricant to be conveyed to the at least one lubrication point via the outlet ports 6. Once the lubricant has been conveyed to the at least one lubrication point, the pressure which has built up in the lubricant line can be relieved by the relief valve 12 being opened.

In the embodiment shown in FIG. 1, a filter 14 is also provided in the primary connecting line 8, upstream of the relief valve 12 and downstream of the inlet ports 4. In this case, the filter 14 is preferably correspondingly received in the main body 2, with the result that, advantageously, the number of connections in the lubricant system can be further reduced since the connections between the filter 14 and the primary connecting line 8 can be provided directly in the main body. This reduces the probability of a lubricant leak. Alternatively, the filter 14 can also be provided upstream of the control block 1.

In order for the risk of a leakage of lubricant to be reduced, the relief valve 12 is also designed to change the state from a closed state to an open state when the pressure in the primary connecting line 8 exceeds a predefined pressure value. This makes it possible to reduce the risk of the lubricant line bursting and/or of a leak occurring on account of an overpressure at a connecting point at which for example two lines are connected together or a line is connected to the control block. Additionally, as a result of the fact that the relief valve 12 opens in the event of an overpressure on the primary connecting line 8, it is possible to dispense for example with a pressure-limiting valve in order to prevent an overpressure in the lubricant system.

The relief valve 12 is designed as a hydraulic valve which is closed by being subjected to a hydraulic pressure. For this purpose, in FIG. 1, provision is made in the main body 2 for at least one control port 16, via which the relief valve 12 is provided with a hydraulic fluid and subjected to hydraulic pressure. For example, a lubricant pump of the lubrication system can be designed to subject the hydraulic fluid to pressure.

In particular, the applied hydraulic pressure is used to determine the pressure value from which, in the primary connecting line 8, the relief valve 12 transitions from the closed state into the open state, in order to relieve the primary connecting line 8 in the event of an overpressure state. For example, the relief valve 12 is designed to open when a multiple of a hydraulic pressure value prevails in the primary connecting line 8.

Figure 2:
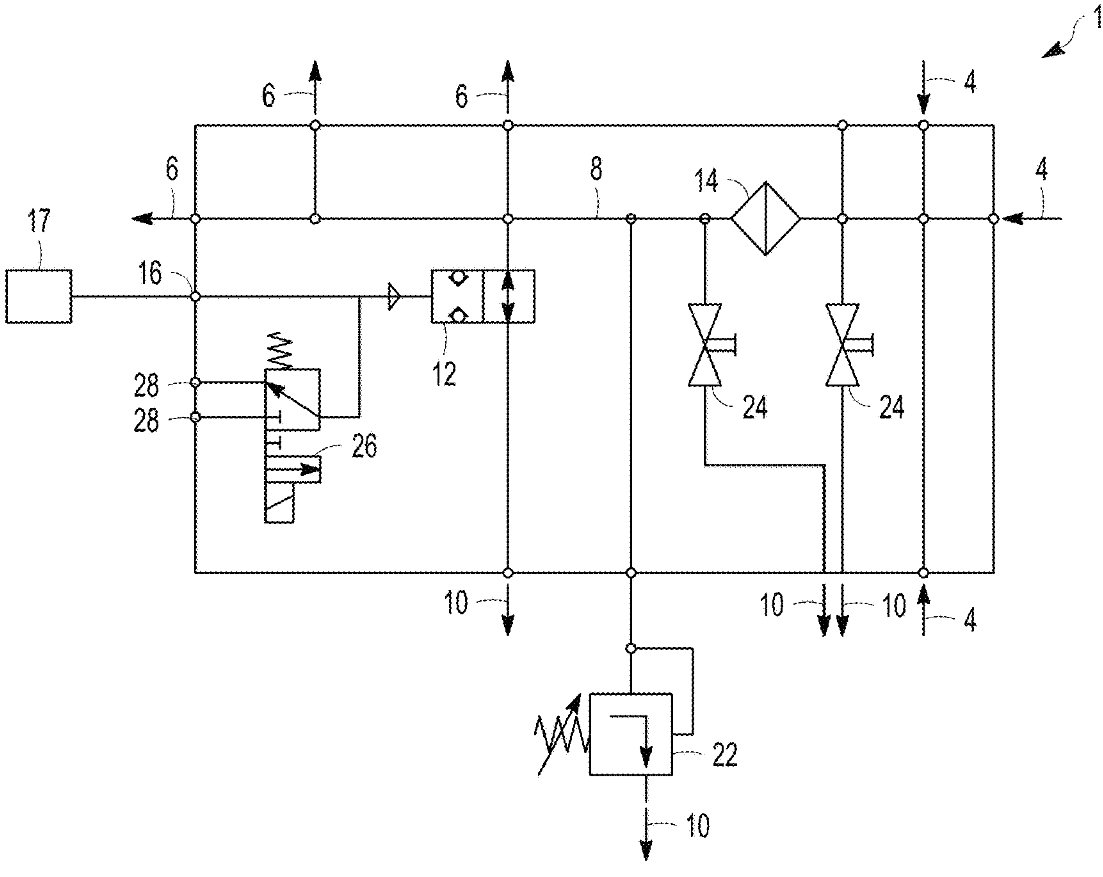
FIG. 2 shows a diagram for a control block according to a second embodiment.
Figure 4:
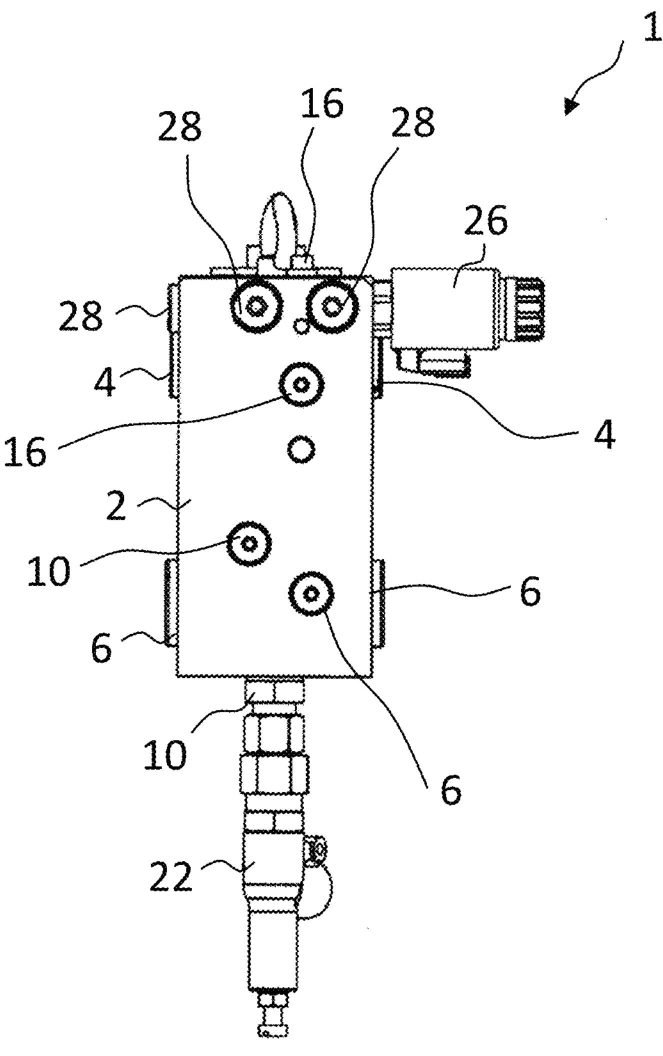
FIG. 4 shows a side view onto the control block according to the second embodiment.

FIG. 2 shows a diagram for a control block 1 for a lubrication system according to a second embodiment, and FIGS. 3 and 4 respectively show a cross-sectional view through a corresponding control block 1 and a side view of the corresponding control block 1.

As is the case with the control block 1 shown in FIG. 1, the control block 1 in FIGS. 2 and 3 comprises a main body 2 (FIGS. 3 and 4) having three inlet ports 4 and three outlet ports 6, wherein only 2 can be seen in FIG. 3. The inlet and outlet ports 4, 6 are connected together via the primary connecting line 8. As is also the case in FIG. 1, a relief valve 12 is provided between the primary connecting line 8 and a return port 10. Furthermore, a filter 14 is provided in the primary connecting line 8, upstream of the relief valve 12 and downstream of the inlet ports 4, and, as can be seen in FIG. 3, said filter is correspondingly received in the main body 2.

In the second exemplary embodiment, too, the relief valve 12 is designed as a hydraulic valve which is closed by being subjected to a hydraulic pressure via at least one control port 16. During the closing operation, a needle-like component 18 is pressed into a corresponding seal seat 20 by means of the hydraulic pressure, in order to close the relief valve 12.

As is the case with the control block 1 in FIG. 1, a lubricant pump of the lubrication system can be designed to subject the hydraulic fluid to pressure, wherein, the applied hydraulic pressure is used to determine the pressure value from which, in the primary connecting line 8, the relief valve 12 transitions from the closed state into the open state, in order to relieve the primary connecting line 8 in the event of an overpressure state. In addition to the overpressure-protection function of the relief valve 12, a pressure-limiting valve 22 is also provided in the return line, in order to reliably protect the lubrication system against an overpressure. Alternatively or additionally, the control block 1 from FIGS. 2 and 3 can also be equipped with two shut-off valves 24, which are closed during normal operation of the central lubrication system and are opened in the case of maintenance, in order to ensure that the lubrication system is free of pressure. For example, the shut-off valves 24 can be opened and closed manually.

In the second embodiment of the control block, as is shown in FIGS. 2 and 3, the relief valve 12 is controlled using an upstream electric valve 26, wherein the electric valve is designed to control the supply of hydraulic fluid. In particular, the electric valve 26 can be designed as a 3/2-way valve. In order to be able to control the electric valve 26, provision is also made in the main body 2 for at least one control port 28 for the electric valve 26. Advantageously, the electric valve 26 can be used to enable a holding time, in which the relief valve 12 continues to be closed, but the lubricant pump has already been switched off. Such a holding time can allow, in the case of a long lubricant line to the lubrication points, a sufficient amount of lubricant to reach the lubrication points even if the lubricant pump of the lubrication system has already been switched off.

As can be seen in FIG. 3, the main body 2 is a monolithic main body, in which bores for the primary connecting line 8 and the receptacle for the relief valve 12 are formed using a material-removing process, for example, drilling, milling, etc. Alternatively or additionally, the main body 2 can also be cast. Preferably, the main body 2 is formed from metal, for example steel or aluminium, or a fibre-reinforced plastics material.

In summary, a control block 1 which reduces the risk of a leakage of lubricant can be provided, wherein provision is made in the control block 1 for a relief valve 12, which transitions from a closed state into an open state when the pressure in the primary connecting line 8 exceeds a predefined pressure value, since the above-described control block 1 reduces the risk of the lubricant line bursting and/or of a leak occurring on account of an overpressure at a connecting point at which for example two lines are connected together or a line is connected to the control block.

LIST OF THE REFERENCE SIGNS

1 control block
2 main body
4 inlet ports
6 outlet ports
8 primary connecting line
10 return port
12 relief valve
14 filter
16 control port
18 component
20 seal seat
22 pressure-limiting valve
24 shut-off valve
26 electric valve
28 control port

What is claimed is:

1. A control block for a lubrication system, the control block comprising:

a main body having at least one inlet port, at least one outlet port, a primary connecting line, and at least one return port, the primary connecting line fluidically connects the at least one inlet port to the at least one outlet port; and a hydraulic valve in the main body, the hydraulic valve being configured so that, in an open state, the hydraulic valve opens a connection between the primary connecting line and the return port, and, in a closed state, the hydraulic valve builds up pressure in the primary connecting line, in order for lubricant to be conveyed to at least one lubrication point via the at least one outlet port, the hydraulic valve being configured to change from a closed state to an open state when pressure in the primary connecting line exceeds a predefined pressure value, the hydraulic valve configured to be placed in the closed state by being subjected to hydraulic pressure;

wherein the main body has at least one control port via which the hydraulic valve is configured to be subjected to the hydraulic pressure, and wherein the hydraulic pressure via the at least one control port is independent of the pressure in the primary connecting line.

2. The control block according to claim 1, wherein the hydraulic valve is configured so that the predefined pressure value is set using the hydraulic pressure.

3. The control block according to claim 1, further comprising a valve upstream of the hydraulic valve and configured to control the hydraulic valve.

4. The control block according to claim 3, wherein the valve is an electric valve.

5. The control block according to claim 4, wherein the electric valve is configured to control a supply of a hydraulic fluid generating the hydraulic pressure.

6. The control block according to claim 1, further comprising a filter upstream of the hydraulic valve.

7. The control block according to claim 6, wherein the filter is provided in the main body, downstream of the at least one inlet port.

8. The control block according to claim 1, wherein the main body is formed from metal or fibre-reinforced plastics material.

9. The control block according to claim 1, in combination with a lubricant pump connected to the at least one control port, wherein the hydraulic valve is configured to be subjected to the hydraulic pressure via the lubricant pump.

10. The control block according to claim 9, wherein the hydraulic valve is configured so that the predefined pressure value is set using the hydraulic pressure.

11. The control block according to claim 10, further comprising a valve upstream of the hydraulic valve and configured to control the hydraulic valve.

12. The control block according to claim 11, wherein the valve is an electric valve.

13. The control block according to claim 12, wherein the electric valve is configured to control a supply of a hydraulic fluid generating the hydraulic pressure.

14. The control block according to claim 13, further comprising a filter upstream of the hydraulic valve.

15. The control block according to claim 14, wherein the filter is provided in the main body, downstream of the at least one inlet port.

16. The control block according to claim 15, wherein the main body is formed from metal or fibre-reinforced plastics material.

17. A lubrication system comprising:

at least one lubricant pump;

at least one lubricant line configured to convey lubricant to at least one lubrication point; and a control block according to claim 1, the control block being arranged downstream of the lubricant pump and upstream of the at least one lubricant line.

18. The control block according to claim 1, wherein the at least one inlet port comprises at least two inlet ports.

19. The control block according to claim 1, wherein the at least one outlet port comprises at least two outlet ports.

20. The control block according to claim 1, wherein the at least one control port is free of fluid communication with the primary connecting line.

21. A lubrication system comprising:

a control block comprising:

a main body having at least one inlet port, at least one outlet port, a primary connecting line, and at least one return port, the primary connecting line fluidically connects the at least one inlet port to the at least one outlet port, the main body being formed from metal or fibre-reinforced plastics material;

a hydraulic valve in the main body, the hydraulic valve being configured so that, in an open state, the hydraulic valve opens a connection between the primary connecting line and the return port, and, in a closed state, the hydraulic valve builds up pressure in the primary connecting line, in order for lubricant to be conveyed to at least one lubrication point via the at least one outlet port, the hydraulic valve being configured to change from a closed state to an open state when pressure in the primary connecting line exceeds a predefined pressure value, the hydraulic valve configured to be placed in the closed state by being subjected to hydraulic pressure;

an electric valve upstream of the hydraulic valve and configured to control the hydraulic valve, the electric valve being configured to control a supply of a hydraulic fluid generating the hydraulic pressure; and a filter upstream of the hydraulic valve, the filter being provided in the main body, the filter being downstream of the at least one inlet port, wherein the main body has at least one control port via which the hydraulic valve is configured to be subjected to the hydraulic pressure, and wherein the hydraulic pressure via the at least one control port is independent of the pressure in the primary connecting line;

wherein the hydraulic valve is configured so that the predefined pressure value is set using the hydraulic pressure;

a lubricant pump connected to the at least one control port, the hydraulic valve being configured to be subjected to the hydraulic pressure via the lubricant pump; and at least one lubricant line configured to convey lubricant to at least one lubrication point; and wherein the control block is arranged downstream of the lubricant pump and upstream of the at least one lubricant line.

22. A control block for a lubrication system, the control block comprising:

a main body having at least one inlet port, at least one outlet port, a primary connecting line, at least one return port, and at least one control port, the primary connecting line fluidically connects the at least one inlet port to the at least one outlet port, the control port being free of fluid communication with the primary connecting line; and a hydraulic valve in the main body, the hydraulic valve being configured so that, in an open state, the hydraulic valve opens a connection between the primary connecting line and the return port, and, in a closed state, the hydraulic valve builds up pressure in the primary connecting line, in order for lubricant to be conveyed to at least one lubrication point via the at least one outlet port, the hydraulic valve being configured to change from a closed state to an open state when pressure in the primary connecting line exceeds a predefined pressure value, the hydraulic valve configured to be placed in the closed state by being subjected to hydraulic pressure via the at least one control port.

23. The control block according to claim 22, in combination with a lubricant pump connected to the at least one control port, wherein the hydraulic valve is configured to be subjected to the hydraulic pressure via the lubricant pump.

24. The control block according to claim 22, wherein the hydraulic valve is configured so that the predefined pressure value is set using the hydraulic pressure.

25. The control block according to claim 22, further comprising a valve upstream of the hydraulic valve and configured to control the hydraulic valve.

26. The control block according to claim 25, wherein the valve is an electric valve configured to control a supply of a hydraulic fluid generating the hydraulic pressure.

27. The control block according to claim 22, further comprising a filter upstream of the hydraulic valve.

28. A control block for a lubrication system, the control block comprising:

a main body having at least one inlet port, at least one outlet port, a primary connecting line, and at least one return port, the primary connecting line fluidically connects the at least one inlet port to the at least one outlet port;

a hydraulic valve in the main body, the hydraulic valve being configured so that, in an open state, the hydraulic valve opens a connection between the primary connecting line and the return port, and, in a closed state, the hydraulic valve builds up pressure in the primary connecting line, in order for lubricant to be conveyed to at least one lubrication point via the at least one outlet port, the hydraulic valve being configured to change from a closed state to an open state when pressure in the primary connecting line exceeds a predefined pressure value, the hydraulic valve configured to be placed in the closed state by being subjected to hydraulic pressure; and a filter upstream of the hydraulic valve, the filter being provided in the main body, the filter being downstream of the at least one inlet port.

29. The control block according to claim 28, wherein the main body has at least one control port via which the hydraulic valve is configured to be subjected to the hydraulic pressure.

30. The control block according to claim 29, wherein the at least one control port is free of fluid communication with the primary connecting line.

31. The control block according to claim 28, in combination with a lubricant pump connected to the at least one control port, wherein the hydraulic valve is configured to be subjected to the hydraulic pressure via the lubricant pump.

32. The control block according to claim 28, wherein the hydraulic valve is configured so that the predefined pressure value is set using the hydraulic pressure.

33. The control block according to claim 28, further comprising a valve upstream of the hydraulic valve and configured to control the hydraulic valve.

34. The control block according to claim 33, wherein the valve is an electric valve configured to control a supply of a hydraulic fluid generating the hydraulic pressure.

* * * * *